United States Patent [19]

Ayotte et al.

[11] 4,119,166
[45] Oct. 10, 1978

[54] DUAL-VEHICLE OPERATING SYSTEM

[75] Inventors: Richard F. Ayotte, Livonia; Trevor O. Jones, Birmingham, both of Mich.

[73] Assignee: General Motors Corporation, Detroit, Mich.

[21] Appl. No.: 812,179

[22] Filed: Jul. 1, 1977

[51] Int. Cl.² ............................................... B60T 7/20
[52] U.S. Cl. ............................... 180/14 R; 280/446 B
[58] Field of Search ........................... 180/14 R, 14 A; 280/443, 446 R, 446 B

[56] References Cited

U.S. PATENT DOCUMENTS

| | | | |
|---|---|---|---|
| 3,880,263 | 4/1975 | Ewald et al. | 188/112 |
| 3,880,472 | 4/1975 | Lewis et al. | 303/7 |
| 3,892,296 | 7/1975 | DePuydt et al. | 188/112 |
| 3,948,544 | 4/1976 | Presley et al. | 280/446 B |
| 3,948,567 | 4/1976 | Kasselmann et al. | 280/446 B X |
| 3,955,652 | 5/1976 | Nilsson et al. | 188/112 |

Primary Examiner—Joseph F. Peters, Jr.
Assistant Examiner—Michael Mar
Attorney, Agent, or Firm—Donald F. Scherer

[57] ABSTRACT

A dual-vehicle operating system permits the simultaneous operation of two automobiles at one time under substantially identical conditions by a single operator. The system has a lead vehicle, with a driver, a servo operated driverless trailing vehicle, and a zero-force mechanical connecting link. An electronic control "drives" the trailing vehicle through servo controls which operate the throttle pedal, brake pedal and steering system of the trailing vehicle. The zero-force link contains transducers which provide lead vehicle responsive inputs to the electronic control so that the trailing vehicle mimics the lead vehicle. Both a manual and an automatic override of the electronic control are present to convert the zero-force link to a mechanical towing system.

3 Claims, 19 Drawing Figures

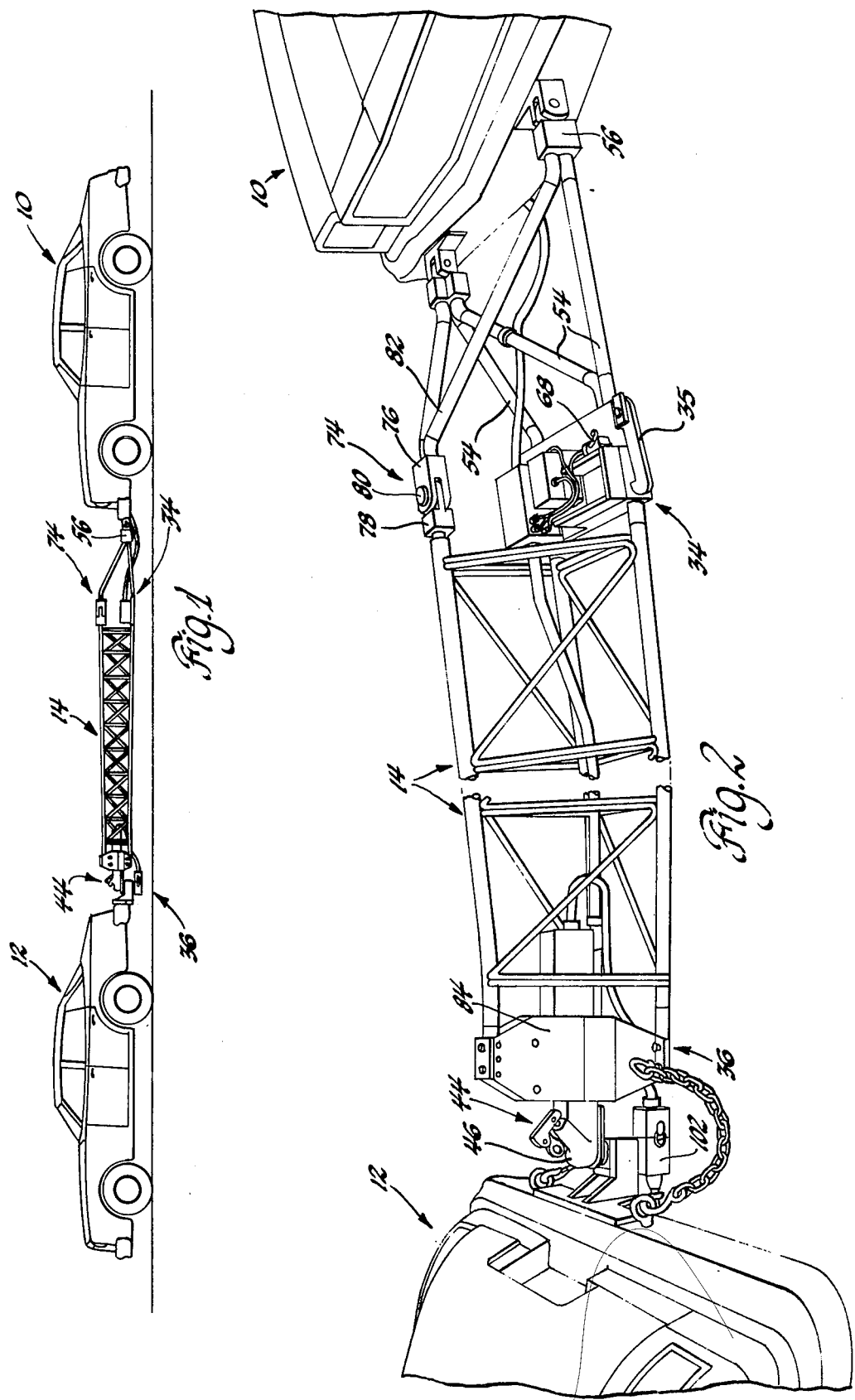

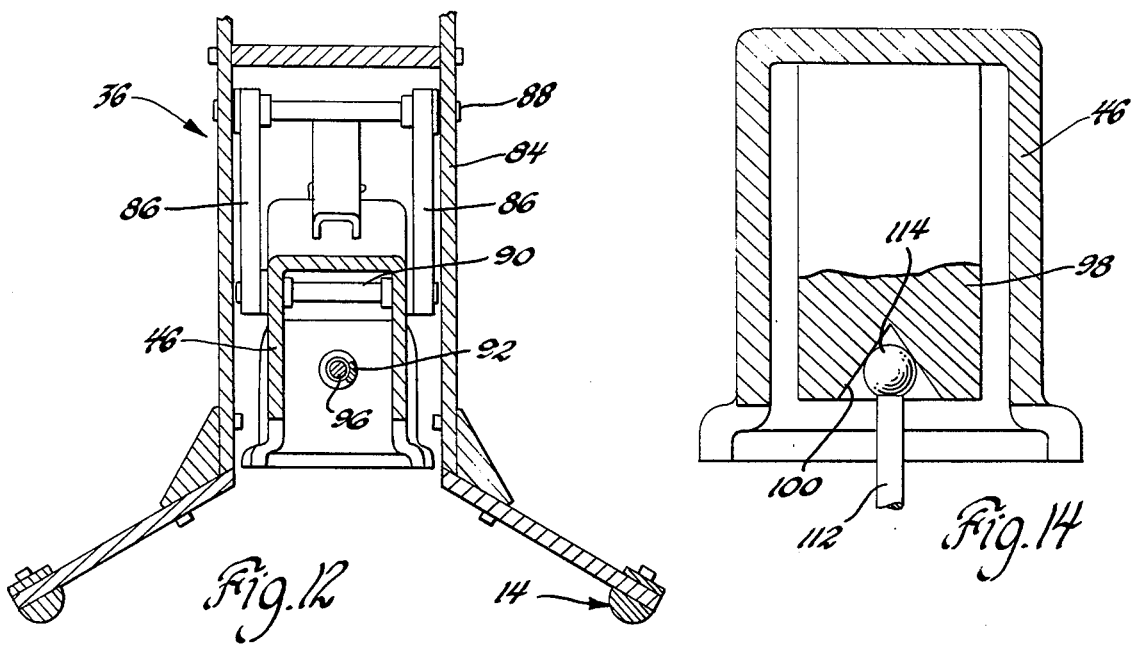
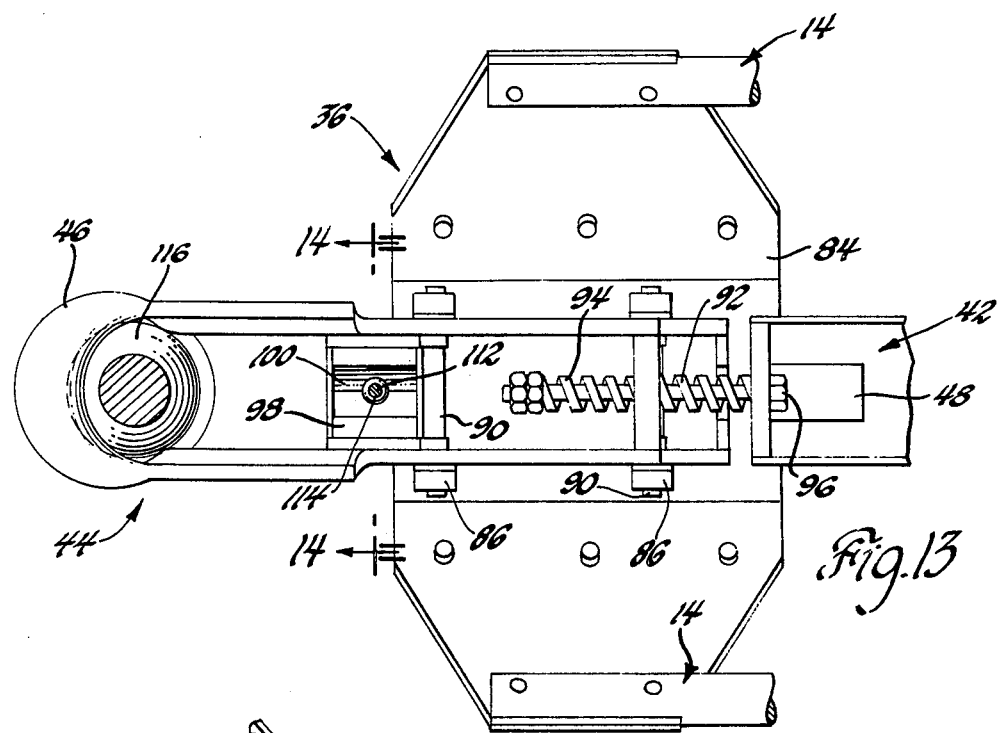
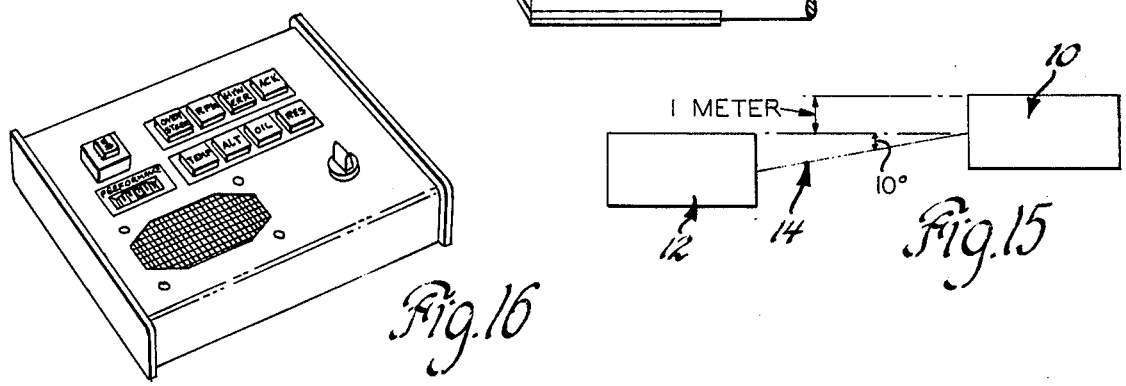

DUAL-VEHICLE OPERATING SYSTEM

This invention relates to vehicle operating systems and more particularly relates to systems for operating two vehicles simultaneously.

The dual-car system was primarily developed to allow one driver to simultaneously operate two test vehicles. The system consists of a lead vehicle with driver, a servo-operated driverless trailing vehicle, and a zero-force mechanical connecting link. An electronic controller, coupled with throttle, brake, and steer servo motors, drives the trail vehicle to mimic the lead vehicle and its driver. The nominal zero-force link, which is approximately one car length or 6 meters long, uses transducers to provide information for the servo operation of the trailing vehicle, and allows safe management of the system in the event of a vehicle or system malfunction.

The dual-car system makes available a safe, accurate and economic means by which two vehicles may be subjected to the same test schedule by a single driver. This system is primarily for use in mileage accumulation type durability testing. The primary objects and advantages of dual-car system vehicle test programs are improved safety, economics, and correlation of test results when comparison of two vehicles is desired. The safety aspect is a direct result of the fact that fewer drivers on the test roads at a given time will automatically reduce the likelihood of driver-caused accidents. Similarly from an economic consideration, the number of drivers needed to operate a given number of test vehicles, will be reduced by one-half. Technical support personnel will, of course, be required, but the net result is a significant reduction in manpower for the conducting of a multiple-vehicle test program. A higher density of vehicles can also occupy a given road system because the trailing vehicle is approximately one car length behind the leading vehicle for all speeds. It is often desirable to study the behavior of two different vehicles when driven on an identical road test schedule. Assurance that the test conditions are in fact similar is obviously enhanced with the dual-car system.

An important consideration in the conduct of valid test programs is that modification to the vehicle itself be held to a minimum in order to produce as nearly as possible a real-world simulation of operating conditions. A great deal of effort is spent in automotive testing to achieve this end. Equipment mass, power demand, and interface techniques have been carefully considered to reduce unrealistic effects on the vehicles during testing. A principle feature of the dual-car system is that the vehicles may be readily separated from the system and driven independently in a normal manner.

All control and safety features are fully automatic, freeing the test driver to operate in essentially the same manner he would while operating a single vehicle. There are no routine adjustments or calibrations necessary in the operation of the system, so driver training is reduced to a familiarization period primarily concerned with adapting to driving a single vehicle with a long trailer attached. The long trailer effect is in itself reduced to a steering consideration, as the zero-force connecting link removes all force inputs to the driven vehicle which are normally experienced with trailer driving. The operation of the trail vehicle and the control system are constantly monitored so that impending or actual malfunctions are signaled to the driver, through an alarm system, and automatic shutdown of the trail vehicle is initiated.

These and other objects and advantages of the dual-car test system will be more apparent from the following description and drawings in which:

FIG. 1 is a side view of the dual-vehicle system;

FIG. 2 is a perspective view of a portion of the dual-vehicle system;

FIG. 12 is a view taken along line 12—12 of FIG. 11;

FIG. 13 is a view taken along line 13—13 of FIG. 11;

FIG. 14 is a view taken along line 14—14 of FIG. 13;

FIG. 15 is a diagrammatic representation of the dual-car test system in another mode of operation;

FIG. 16 is a perspective view of the readouts provided for the driver of the lead vehicle;

MAJOR SYSTEM COMPONENTS

Trail Car

Figure 3:
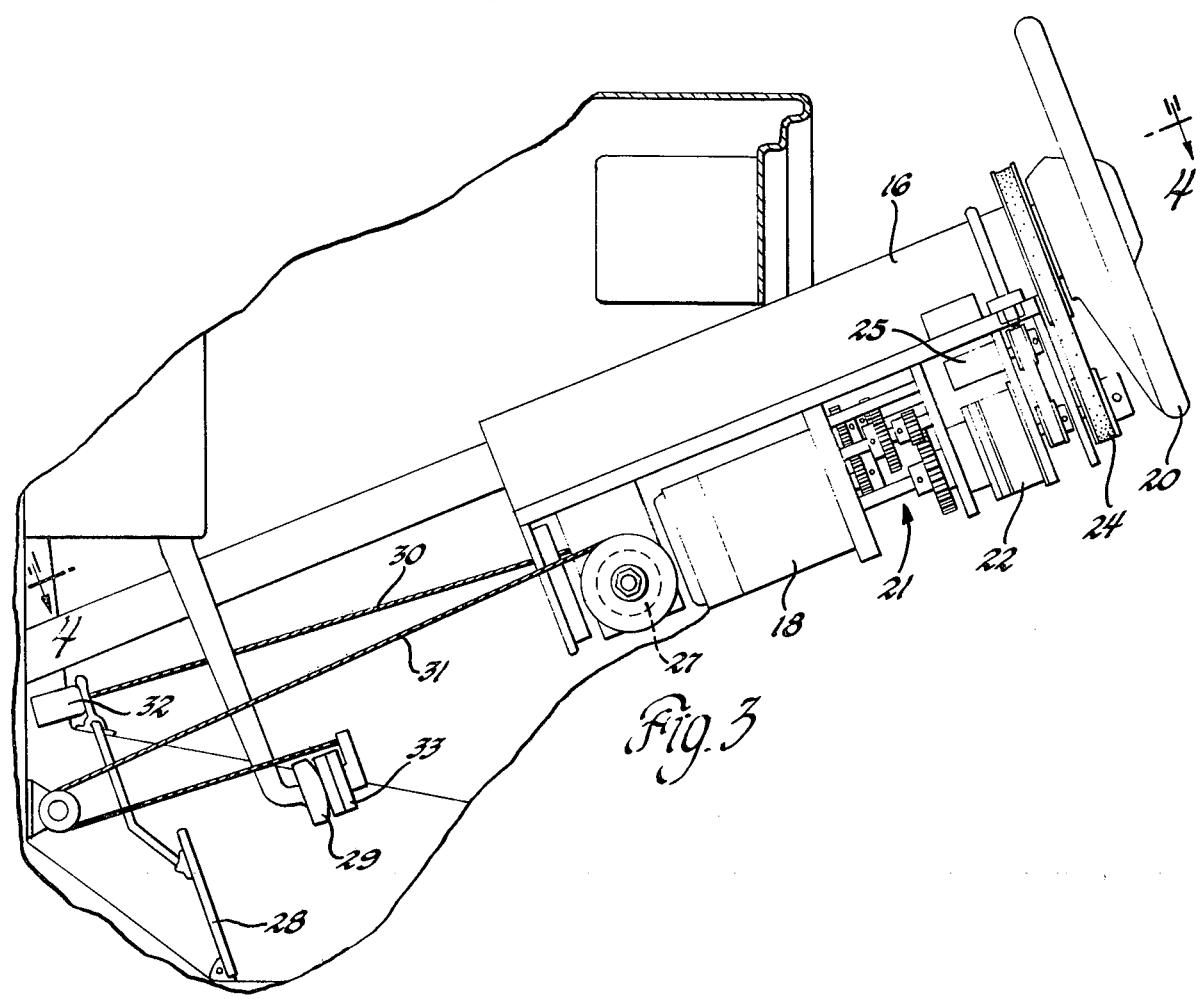
FIG. 3 is an elevational view of the steering, brake, and throttle servo-systems in the vehicles.
Figure 4:
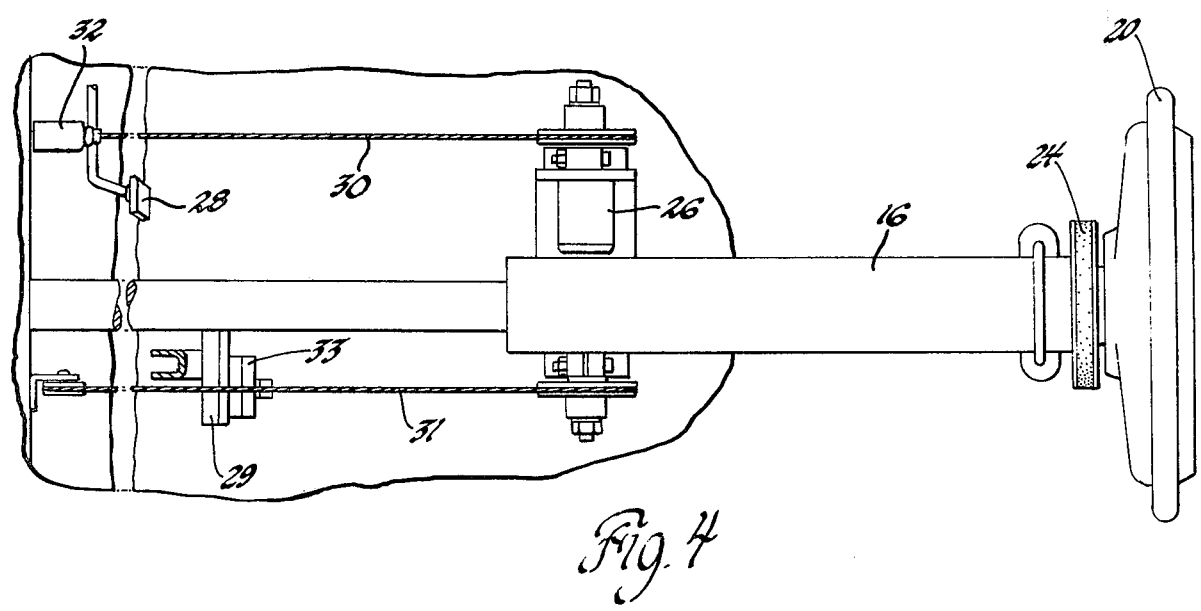
FIG. 4 is a view taken along line 4—4 of FIG. 3.

The basic concept of the dual-car system, shown in FIGS. 1 and 2, is that of a totally automatic driverless trail vehicle 10 which accurately mimics a driver-operated lead vehicle 12. The lead and trail vehicles are connected by a mechanical headway link or zero-force 14. Steering wheel, accelerator pedal, and brake pedal actuations necessary to accomplish this are provided by three independent closed-loop servo systems. These servo systems form an integrated actuator assembly which is mounted on the steering column 16 of the trail vehicle 10 as shown in FIGS. 3 and 4. All three servo motors are 12-volt DC permanent magnet gear motors. The steer servo motor 18 is connected to the steering wheel 20 through a gear train 21, an electromagnetic clutch 22 and a gear belt 24. Rotation of the steering wheel is sensed by a steer transducer or potentiometer 25. The accelerator and brake servo motors 26, 27 actuate their respective pedals 28, 29 through cable arrangements 30, 31, respectively, allowing maximum flexibility of installation for different vehicle pedal locations. A conventional linear displacement transducer 32 senses throttle movement, while a conventional force transducer 33 senses the brake apply force. The servo loop feedback transducers associated with each function are: steer angle, mounted within the steer actuator gearbox; accelerator pedal angle, mounted on the upper pedal arm; and brake pedal force, a strain gauge transducer mounted on the brake pedal. Each servo function includes a separate control loop using conventional pulse width modulated (PWM) motor drivers which can respond to command voltage signals originating from a conventional electronic control unit. The lead vehicle 12 has similar transducers on the accelerator pedal and brake pedal, not shown, for initiating acceleration and brake signals to the trail vehicle.

The force and rate capabilities of each servo mechanism, listed in Table 1 below, are consistent with the normal steering and pedal efforts required for the mileage accumulation type driving schedules on which the system was designed to operate. Table 1 also includes the approximate power drain on the vehicle electrical system during the maximum servo effort levels listed. Under normal operation, the electrical load of the servos approximates the average vehicle accessory load. Both manual and power assist steer and brake functions are included within these ranges. The general mechanical configuration of the actuator assembly allows normal operation of the vehicle by a driver when it is disconnected from the lead car.

Table 1

| Servo Mechanism Specifications | | |
|---|---|---|
| Steer Rate: | 1 rps | |
| Steer Torque: | 28 N m | at 240 W |
| Brake Pedal Rate: | 100 mm/s | |
| Brake Pedal Force: | 450 N | at 72 W |
| Accelerator Pedal Rate: | 200 mm/s | |
| Accelerator Pedal Force: | 90 N | at 48 W |

Connecting Link

The headway link 14 maintains a fixed distance, six meters, between the lead and trail vehicles while permitting the required turning maneuvers. The headway link 14 serves as the source of some control signals and a medium for information transmitted between the lead car 12 and the trail car 10.

The length of the headway link 14 is a compromise between acceptable drafting loads, cooling air-flow restriction, and overall manageability of the system under normal test driving conditions.

Figure 5:
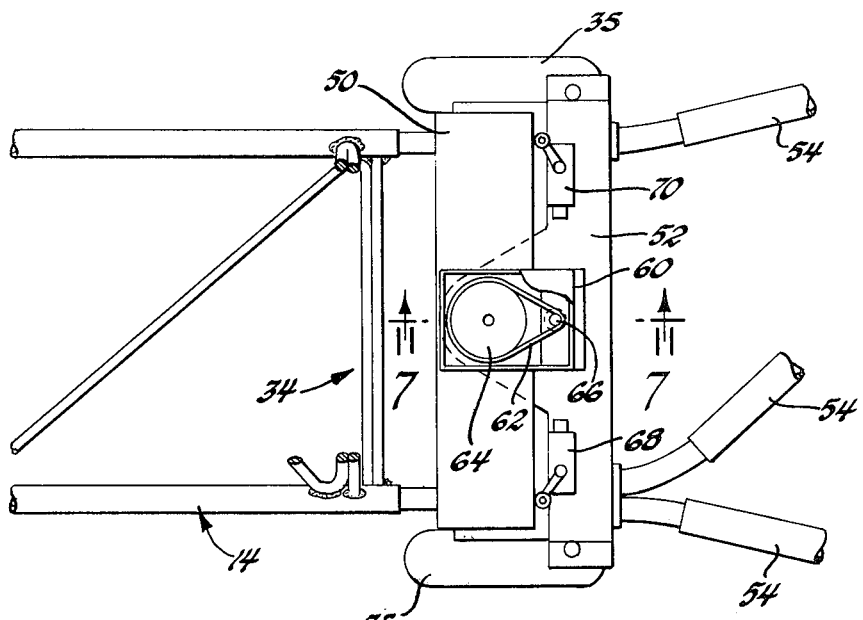
FIG. 5 is a top view of the rear pivot of the connecting link.

A 20° articulation point or rear pivot 34, FIG. 5, at the rear of the link 14 permits lateral freedom within this range, and the articulation point 34, through latch arms 35, also limits offset tracking between the two vehicles to 1 meter which is approximately an angle of 10° between the longitudinal axes of the link 14 and trail vehicle 10, as shown in FIG. 15, in the event that the trail vehicle 10 doesn't track correctly. When this limit is reached, the rear pivot 34 is automatically latched, FIG. 5a, to prevent further swaying of the trail car, and the steer servo clutch 22 is simultaneously disengaged to allow the front wheels of the trail vehicle 10 to castor normally. The link 14 is connected to the lead vehicle 12 through a front pivot 36. This places the system in a conventional towing mode. In this mode, the system is driveable at speeds up to 110 km/h, allowing the driver to bring the system to a safe stop.

Figure 7:
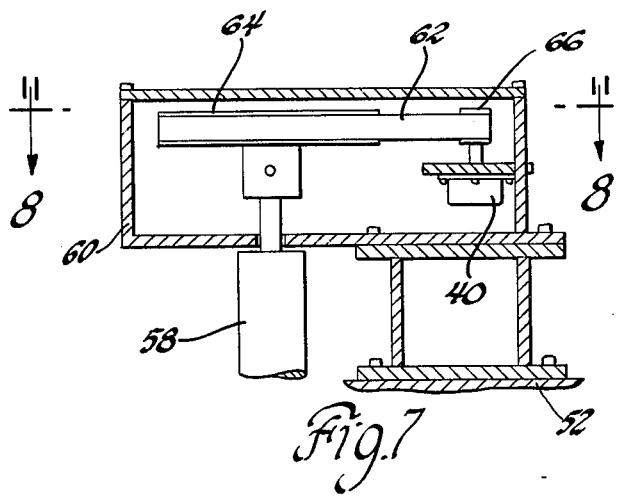
FIG. 7 is a view taken along line 7—7 of FIG. 5.
Figure 8:
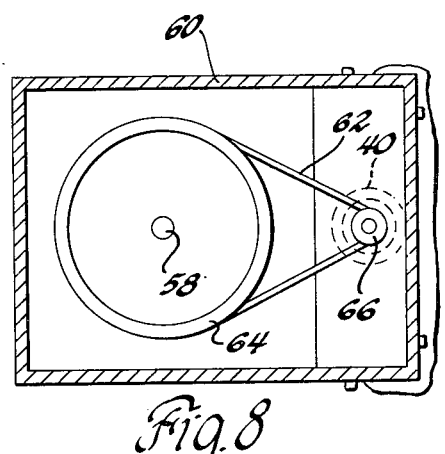
FIG. 8 is a view taken along line 8—8 of FIG. 7.
Figure 9:
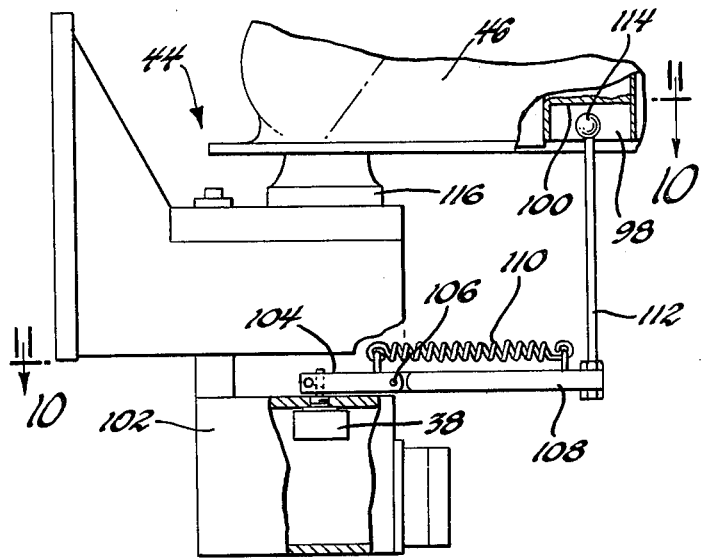
FIG. 9 is a side view partly in section of a portion of the front hitch.
Figure 10:
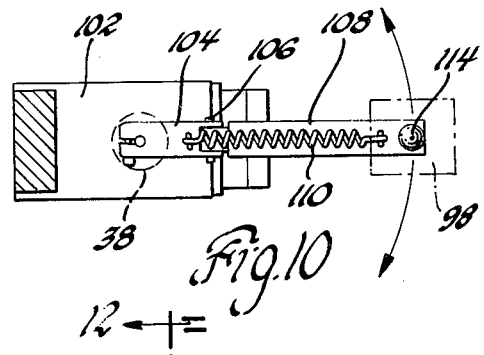
FIG. 10 is a top view of a portion of the front hitch taken along line 10—10 of FIG. 9.
Figure 11:
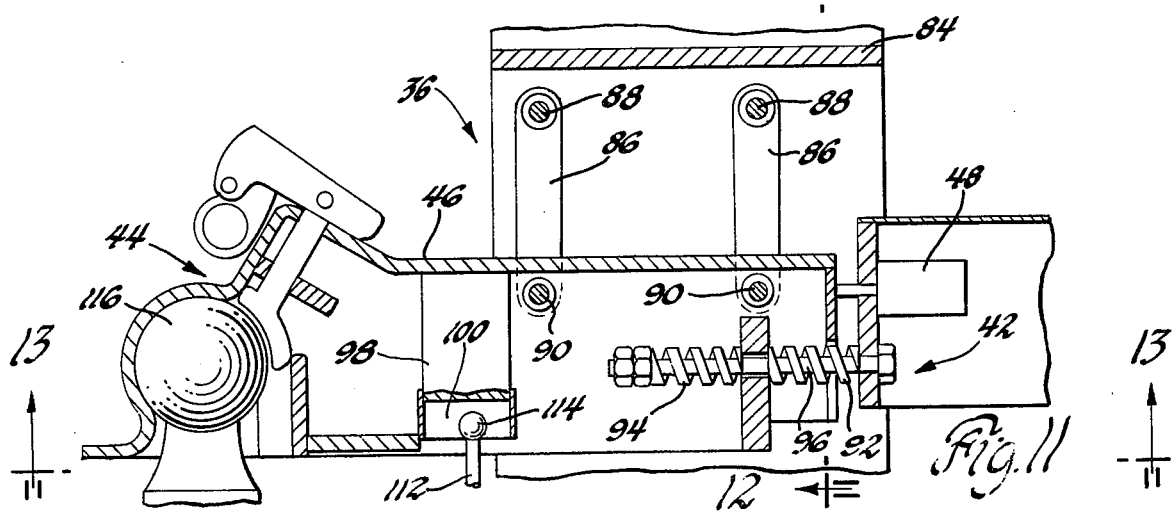
FIG. 11 is a side view partly in section of a portion of the front hitch.

The primary steer control signal for the trail vehicle's steer servo is produced by an angle transducer potentiometer 38, FIG. 9, located at the lead pivot 36 end of the link 14. This information is summed with angle information derived from a second angle transducer potentiometer 40, FIG. 7, located at the rear pivot point 34. These signals comprise a command input to the steer servo to complete an open-loop servo control, discussed later, which maintains the trail car in alignment with the longitudinal axis of link 14 at all times.

Normal performance variations between two vehicles will cause axial forces to be generated in the link 14 and reflected back to both vehicles. Since a primary use of this system is vehicle drive-train testing, these forces cannot be tolerated. A force transducer 42, positioned to detect force transmission between the link 14 and a hitch assembly 44 at the front pivot 36 of the link 14, measures these forces for inclusion in the accelerator and brake pedal control loops. The force transducer 42, having a measurement range of ± 2000 N, consists of a parallelogram mounted, spring-loaded ball hitch 46 and a conventional linear variable displacement transducer 48. The parallelogram mounting permits fore and aft movement between the ball hitch 46 and the link 14.

The rear pivot 34 has a base member 50 secured to the headway link 14 and a pivotable frame member 52 which is secured via support members 54 to a frame member 56 which is secured to the trailing vehicle 10. The member 52 is pivotally connected to the member 50 such that relative angular movement is possible between the headway link 14 and the trail vehicle 10. The pivotal connection is made via a pin 58 which is secured to the member 50 and is pivotally supported in a bushing, not shown, in the member 52. The angle transducer 40 is mounted in a housing 60 which is secured to the member 52 such that the housing 60 will pivot with the trail vehicle 10. The transducer 40 is connected through a belt drive 62 to a pulley 64 which is rotatably mounted on the pin 58. Thus, as the relative angle between the trail vehicle 10 and the headway link 14 is changed, the transducer 40 will be rotated. For extension of useful range and life considerations, there is an 8:1 ratio between the pulley 64 and a pulley 66 which is secured to the angle transducer 40.

Figure 5A:
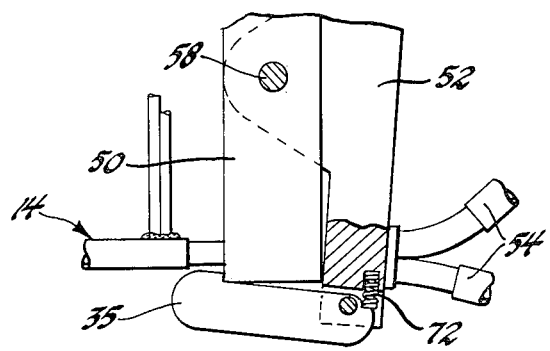
FIG. 5a is a top view of a portion of the latching mechanism.
Figure 6:
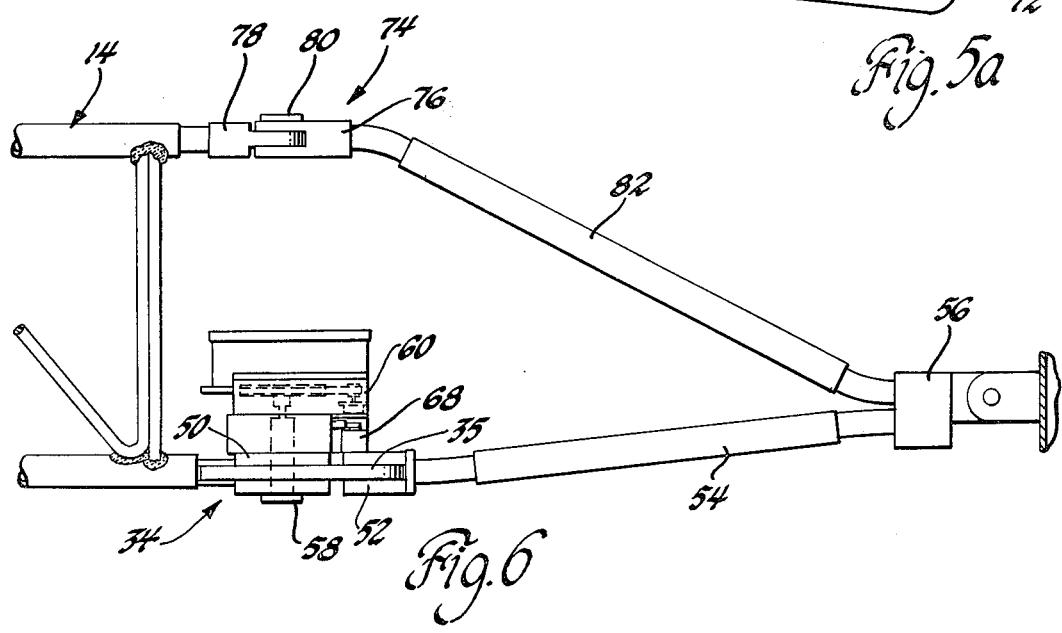
FIG. 6 is a side view of the rear pivot of the connecting link.

Also mounted on the member 52 are a pair of limit switches 68 and 70 which are set to be actuated when the member 52 is rotated to an angle of 10° relative to the headway link 14. The switches 68 and 70 are operable to disconnect the steer clutch 22 of the trail vehicle steer system to permit the trail vehicle wheels to castor normally. Also when the angle of 10° is reached between the headway link 14 and the trail vehicle 10, one or the other of the latch arms 35 which are pivotally connected to member 52 will latch onto the member 50 as shown in FIG. 5a. This prevents the relative angle between the trail vehicle 10 and the headway link 14 from changing so that the position of the trail vehicle, as shown in FIG. 15, will be maintained. The latch arms 35 are spring-loaded by compression springs 72 such that during normal operation the latch arms 35 are spring-loaded against the member 50. The latch arms must be movably disengaged to permit normal operation.

The trailing pivot 34 has an upper pivot portion 74 which is comprised of a U-shaped bracket 76 which is rotatably connected to the headway link 14 through a tongue-bracket 78. The members 76 and 78 are connected by a pin member 80 which permits pivotal relationship between the brackets. The bracket 76 is secured by a support or structure member 82 which in turn is secured to the frame member 56

The lead pivot 36 includes the hitch assembly 44 and the force transducer 42. The hitch assembly 44 is connected to a housing 84 by four rod members or links 86. The links 86 are pivotally connected by pins 88 to the housing 84 and by pins 90 to the ball hitch 46. This four-bar linkage or parallelogram mounting permits free longitudinal movement of the ball hitch 46 relative to the housing 84 and therefor the headway link 14. The ball hitch 46 is inhibited from longitudinal movement by a pair of compression springs 92 and 94 which are trapped between the ball hitch 46 and the housing 84 by a pin member 96 and the rear of the housing 84. Thus a predetermined force between the headway link and the lead vehicle is necessary to provide the longitudinal movement. The longitudinal movement is measured by the conventional linear variable displacement transducer 48. Since the springs 92 and 94 provide a predetermined force reaction to achieve the longitudinal movement, the transducer 48 will effectively measure the force determined between the lead vehicle and the headway link which is, of course, the force between the lead vehicle and the trail vehicle. The output of the transducer is proportional to the longitudinal force exerted on the connecting link 14. Also, secured in the ball hitch 46 is a block 97 which has a V-groove 100 formed therein.

As seen in FIG. 9, the angle transducer 38 of the lead pivot is mounted in a housing 102. The transducer 38 is connected to a bar 104 which is pivotally connected by a pin 106 to a bar 108. The pin connection 106 permits vertical pivoting of the bar 108 relative to the bar 104. A tension spring 110 provides a force to pivot the bar 108 relative to the bar 104. Secured to the bar 108 is a follower arm 112 which has a ball or sphere 114 at its distal end. The sphere 114 is held in engagement with the V-groove through the action of the spring 110. The V-groove 100 and pin 106 permit limited vertical angular displacements between the headway link 14 and the lead vehicle caused by road surface imperfections without affecting the transducer 38. However, longitudinal angular displacement between the lead vehicle and the headway link is sensed by the arm 112 and transmitted to the lead angle transducer 38 such that a signal proportional to the angle between the longitudinal axes of the lead vehicle 12 and the link 14 is available. The housing 102 is secured to a sphere 116 which is connected to the lead vehicle and cooperates with the ball hitch 46 to provide a pivotal connection between the lead vehicle and the headway link. This, of course, is a well-known method of attaching two devices together for relative angular displacement.

Lead Car

The lead car is equipped to provide accelerator and brake pedal information for direct mimic by the trail car servo mechanisms. In addition, turn signal, back-up lamp, and transmission selector position information is sensed for communication to the electronic control unit in the trail vehicle. Accelerator pedal angle and brake pedal force are monitored using the same type of transducers as used in the trail car. The transducer signal conditioning electronics are housed in a driver information package, and include conventional displays and annunciators, as shown in FIG. 16, which provide the driver with information regarding the status of the trail vehicle and certain critical system control parameters. Table 2 lists the various display and switch functions found in the driver information package which also contains an audio intercom which allows the lead car driver to listen to the operation of the trail car. This combination of aural and visual information closely duplicates the level of information available to a driver of a normally driven vehicle.

Table 2

| Driver Information Package Functions | |
|---|---|
| Oversteer: | Warns driver that he is attempting to negotiate a turn of shorter radius than system limits allow. |
| RPM: | Indication of trail car engine overspeed or stall. |
| Hdwy-Err: | Indication that the time integral of inter-vehicle axial forces is exceeding preset limits. |
| Temp: | Repeats engine temperature lamp on trail car. |
| Alt: | Repeats alternator lamp on trail car. |
| Oil: | Repeats oil pressure lamp on trail car. |
| Ack: | Allows driver to silence aural alarm while retaining visual indication. |
| Reset: | Allows reset of all alarm indicators if fault has been corrected. |
| Performance: | Provides indication of relative signal levels required by the pedal servo controllers to produce zero axial forces in the headway link. |
| Emerg. Stop: | This is a direct control input which the operator can introduce into the electronic control system, and initiates the following sequence of events: Disconnect primary vehicle (12-volt battery) power to the electronic control system. Return the trail car accelerator pedal to the fully closed position. Turn off the trail car ignition system. Apply light brake pedal force in the trail car. |

The emergency stop sequence is automatically initiated whenever an rpm alarm condition is received. In the event of multiple alarms occurring at the same time, the first alarm received causes that indicator to flash on and off while the remaining alarms are continuously on. This assists the driver in determining which fault initiated the alarm condition.

Basic Servo Control

The steer, accelerator, and brake actuating servos will utilize a common conventional control design consisting of a 12-volt DC permanent magnet gear motor, transistorized pulse width modulated (PWM) motor drive, and an associated feedback transducer.

Each of the three identical PWM motor drive electronic component sets are contained on separate, interchangeable printed circuit boards. These circuit boards are housed in a conventional manner in an electronic control unit, not shown. The PWM drive technique, in conjunction with DC servo motors, is used to minimize power loss between the vehicle 12-volt electrical system and the motors. Power pulses to the servo motors are width modulated at 330 Hz. The algebraic sum of incoming command and feedback signals is continuously compared to an internally generated triangle wave, and the resulting PWM pulse train is applied to four motor-drive transistors arranged in a conventional "H" bridge configuration.

The response characteristics of steering, accelerator pedal, and brake pedal will vary from vehicle to vehicle. These variations are accommodated in each motor-drive control through the use of adjustable gain and integral and rate feedback elements; thus allowing optimization of each servo loop to the vehicle in which it is installed. The servo control system is operational with conventional vehicle electrical system voltages ranging from 8 to 16 volts DC over an ambient temperature range of −10° to +70° C. Conventional automatic current limiting is included in each motor-drive control to provide motor and circuit element protection.

Steer Control Description

Figure 17:
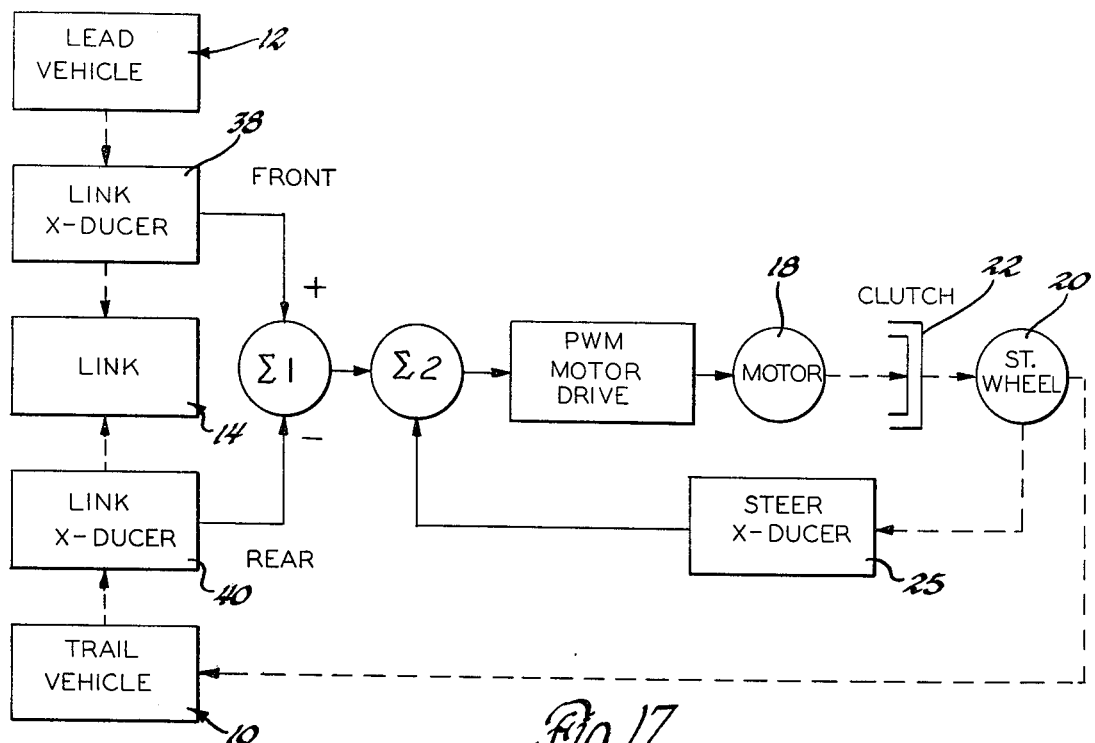
FIG. 17 is a schematic diagram of the steer control system for the dual-car system.

The basic steer control configuration is shown in the block diagram of FIG. 17. The minor control loop consists of a summing point 2, a PWM motor-drive control, the motor 18, the electromagnetic clutch 22, and the steer transducer 25. This minor loop receives command signals directly from a summing point 1. The front and rear link angle transducers 38 and 40 have fixed gain relationships to the trail vehicle's steering wheel 20, and ultimately to its front wheels. The geometry of the total system of lead car 12, headway link 14, and trail car 10, during turning maneuvers, is dictated by this gain relationship. Alignment of the link 14 and the trail car 10 is approximated by a direct 3:1 ratio between the angle of the angle transducer potentiometer 38 and the front wheel angle of the trail car.

Errors in this approximation are caused by vehicle steering ratio variations and lateral forces introduced into the vehicle by side wind or road slope. These errors are corrected by summing information from the rear link angle transducer in a negative direction at a ratio of 1:1.

The dual-car system may be driven in reverse to aid in parking or driving around obstacles. In order to maintain alignment of the trail car and the link, the sense of the steer command signal must be reversed. This is automatically accomplished whenever the lead car's transmission selector is placed in "reverse" by detecting the back-up lamp "on" condition, and inverting the signal path between summing points 1 and 2.

The clutch 22 shown in the steer control block diagram is automatically energized when the lead car's transmission is engaged in either "drive" or "reverse". The drive motor is declutched from the steering wheel when the limit of the link rear pivot point is reached. This occurs simultaneously with mechanical latching of the pivot, and allows the trail vehicle's front wheels to castor normally.

Pedal Control

Figure 18:
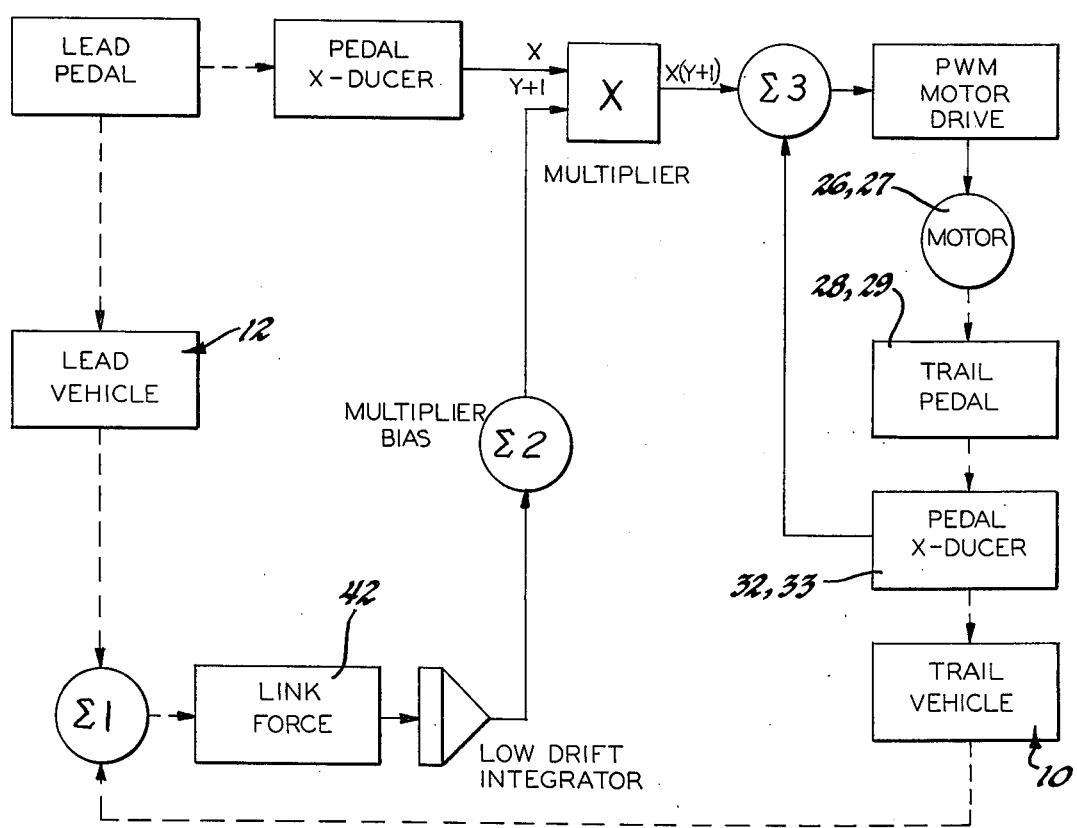
FIG. 18 is a schematic view of the brake and throttle pedal controls used in the dual-car test system.

The pedal control block diagram shown in FIG. 18 is typical for both the accelerator pedal servo and the brake pedal servo. The link force transducer output is the only signal which is common to these two separate control loops. The following description will refer only to "pedal" actuation. The accelerator pedal is a conventional angular control, and the brake pedal is a conventional force control.

The minor control loop, beginning at summing point 3, acts to duplicate the lead vehicle's pedal activity in the trail car. This action is modified by a multiplier which adjusts the gain of the lead pedal transducer as required to produce trail vehicle performance consistent with zero axial forces in the headway link 14.

Prior to introduction to the multiplier, the link force signal is conditioned by an integrator whose time constant is several times longer than normal vehicle drive-train response times. In addition, the integrator is placed in a "hold" mode when a pedal is inactive. The resulting control action produces a trail vehicle response which averages out the transient effects of automatic transmission gear shifting and road roughness, while continuously nulling axial link forces. Placing the integrator in "hold" during periods of pedal inactivity allows the most recent loop gain requirements to be available for the next pedal actuation. An example of this is the pedal activity required for repeated vehicle accelerations alternated with full stops.

Summing point 2 introduces a constant bias to provide unity gain through the multiplier when the axial force signal impressed on the integrator by the force transducer 42 is at null. This bias also establishes unity multiplier gain when the system is first turned on at the start of a driving schedule. Since the magnitude of the integrator output signal is directly related to trail vehicle performance, this information is displayed to the lead car driver on the "performance indicator". The performance indicator monitors the accelerator pedal control function only, and provides a subjective "feel" for relative trail car engine response changes over the life of a test program.

The total effectiveness of this control concept in the longterm maintenance of zero axial forces on either vehicle has been established. During initial operation of the system, both the lead and trail vehicles were fitted with rear wheels which had been strain-gauged to indicate the torque reaction developed between the vehicle and the road. This torque information was combined with speed information to produce vehicle power data which was used to compare vehicle efficiencies under various driving conditions. Two cars were operated on selected segments of the Federal Emission Durability Mileage Accumulation Schedule, both separately and while connected with the dual-car system. The test sequence was carefully controlled, using the same driver, roadway, and climate conditions for numerous consecutive repeats of the schedule. The test results demonstrated an average decrease in trail car power of 1.5 percent (at 55 km). The range of decreased power is zero percent at 10 km/h to 3 percent at 110 km/h. This decrease is for the trail car when operating in the dual-car mode, and is caused by the drafting effect produced by the lead vehicle. Effects on the lead car were consistently less than the overall variables encountered during the tests.

Obviously, many modifications and variations of the present invention are possible in light of the above teaching. It is therefore to be understood, that within the scope of the appended claims the invention may be practiced otherwise than as specifically described.

What is claimed is:

1. A dual-vehicle operating system comprising; a manually operated lead vehicle; an automatically operated trail vehicle; signal means on said lead vehicle for emitting signals proportional to the input of the operator; servo control means on said trail vehicle for changing the operation thereof in response to the signals emitted by said lead vehicle signal means; a mechanical connection of predetermined length mechanically and pivotally connected between the lead and trail vehicles; force sensing means on said mechanical connection for determining the presence of any longitudinal force along the longitudinal axis of said mechanical connection between the lead and trail vehicles; said servo control means on said trail vehicle being responsive to said force sensing means for varying the operation of the trail vehicle such that the force between the vehicles is returned to zero; and means on said lead vehicle, said trail vehicle and said mechanical connection for steering said trail vehicle in response to steering of said lead vehicle and for maintaining the longitudinal axis of the trail vehicle aligned with the longitudinal axis of the mechanical connection.

2. A dual-vehicle operating system comprising; a manually operating lead vehicle; an automatically operated trail vehicle; a mechanical link of predetermined length mechanically and pivotally connected between the lead and trail vehicles; force sensing means on said mechanical link for determining the presence of any longitudinal force between the lead and trail vehicles; first angle sensing means operatively connected between said mechanical link and said lead vehicle for sensing angular displacement between the longitudinal axis of said lead vehicle and said mechanical link; second angle sensing means operatively connected between said mechanical link and said trail vehicle for sensing angular displacement between the longitudinal axes of said mechanical link and said trail vehicle; and servo controlled electrically operated means for controlling operation of said trail vehicle responsive to said force sensing means for varing the operation of the trail vehicle such that the force between the vehicles is returned to zero, and being responsive to said first angle sensing means to initiate steering of said trail vehicle when said lead vehicle is steered sufficiently to cause angular displacement between the longitudinal axes of said lead vehicle and said mechanical link, and being responsive to said second angle sensing means to limit the steering of said trail vehicle so that the longitudinal axes of said mechanical link and said trail vehicle are aligned.

3. A dual-vehicle operating system comprising; a manually operated lead vehicle; an automatically operated trail vehicle; a mechanical connection of predetermined length mechanically pivotally connected between the lead and trail vehicles; force sensing means on said mechanical link for determining the presence of any longitudinal force between the lead and trail vehicles; servo controlled electrically operated means on said trail vehicle responsive to said force sensing means for varying the operation of the trail vehicle such that the force between the vehicles is returned to zero; steer control means on said lead vehicle, said trail vehicle and said mechanical connection for steering said trail vehicle in response to steering of said lead vehicle; and latching means operatively connected between said mechanical link and said trail vehicle for limiting the maximum angular displacement between the longitudinal axes of said mechanical link and said trail vehicle to a predetermined value, and including means for preventing operation of said steer control means to permit free castoring of the steerable wheels of said trail vehicle.

* * * * *

UNITED STATES PATENT AND TRADEMARK OFFICE
CERTIFICATE OF CORRECTION

PATENT NO. : 4,119,166
DATED : October 10, 1978
INVENTOR(S) : Richard F. Ayotte and Trevor O. Jones It is certified that error appears in the above-identified patent and that said Letters Patent are hereby corrected as shown below:

Column 4, line 62, insert a period (.) after "member 56".

Column 5, line 19, "97" should read -- 93 --.

Column 6, line 43, "will" should read -- all --.

Column 9, line 20, "varing" should read -- varying --.

Column 10, line 7, after "mechanically" insert -- and --.

Column 10, line 9, delete "link" and insert -- connection --.

Column 10, line 20, delete "link" and insert -- connection --.

Column 10, line 22, delete "link" and insert -- connection --.

Signed and Sealed this

First Day of May 1979

[SEAL]

Attest:

RUTH C. MASON
Attesting Officer

DONALD W. BANNER
Commissioner of Patents and Trademarks